United States Patent
Ito

(10) Patent No.: US 10,924,663 B2
(45) Date of Patent: Feb. 16, 2021

(54) INFORMATION PROCESSING APPARATUS HAVING TWO MODULES THAT HAVE INDEPENDENT CLOCK SUPPLY SOURCES, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Shigeyoshi Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/738,089

(22) Filed: Jan. 9, 2020

(65) Prior Publication Data

US 2020/0228704 A1 Jul. 16, 2020

(30) Foreign Application Priority Data

Jan. 15, 2019 (JP) .............................. JP2019-004342

(51) Int. Cl.
*H04N 5/232* (2006.01)
*H04N 5/225* (2006.01)

(52) U.S. Cl.
CPC ....... *H04N 5/23227* (2018.08); *H04N 5/2258* (2013.01); *H04N 5/23293* (2013.01)

(58) Field of Classification Search
CPC ........... G01V 2200/12; G01R 31/31726; H04J 3/0638; H04N 21/242; H04N 5/23227; H04N 5/23293; H04N 5/2258; H04N 5/3765
See application file for complete search history.

(56) References Cited

U.S. PATENT DOCUMENTS

| 2008/0037953 | A1* | 2/2008 | Kawamura | H04N 5/783 386/343 |
| 2015/0070527 | A1* | 3/2015 | Yanada | H04N 5/23241 348/222.1 |
| 2017/0085755 | A1* | 3/2017 | Kim, II | H04N 5/23203 |

FOREIGN PATENT DOCUMENTS

JP 5631084 B2 11/2014

* cited by examiner

*Primary Examiner* — Yogesh K Aggarwal
(74) *Attorney, Agent, or Firm* — Cowan, Liebowitz & Latman, P.C.

(57) ABSTRACT

An information processing apparatus that is capable of reducing deviation of cycles of modules having independent clock supply sources. A processor controls a first module to operate in synchronization with a first synchronizing signal supplied from a first timing controller, controls a second module to operate in synchronization with a second synchronizing signal supplied from a second timing controller, measures times of supplying the synchronizing signals to the modules, calculates a time difference between the times when the first timing controller is switched to a second mode where the first synchronizing signal is supplied to the first module based on a setting period after synchronizing the synchronizing signals in a first mode where the first synchronizing signal is supplied to the first module in synchronization with the second synchronizing signal, and changes the setting period when the time difference is more than a threshold.

19 Claims, 14 Drawing Sheets

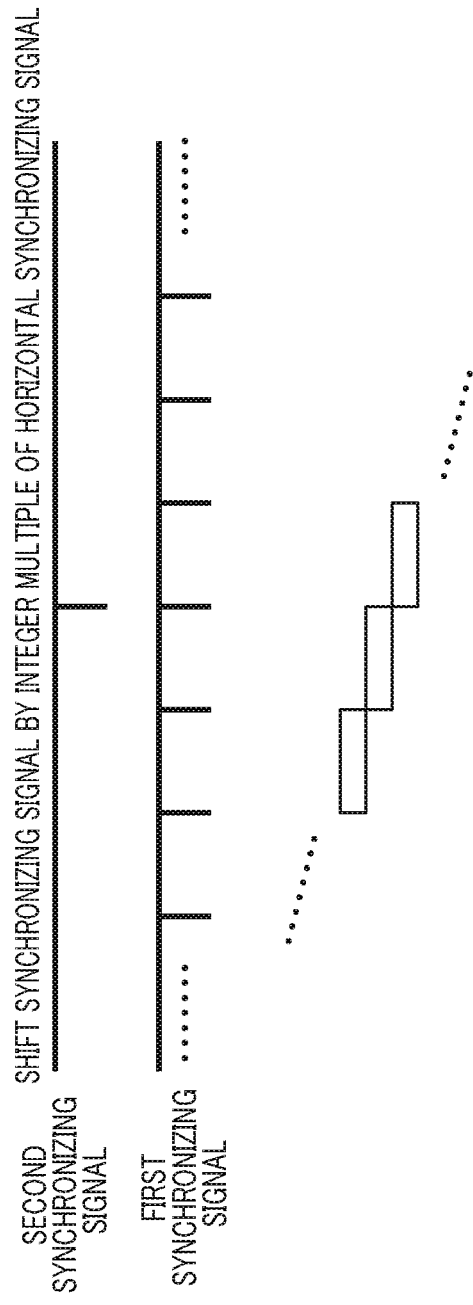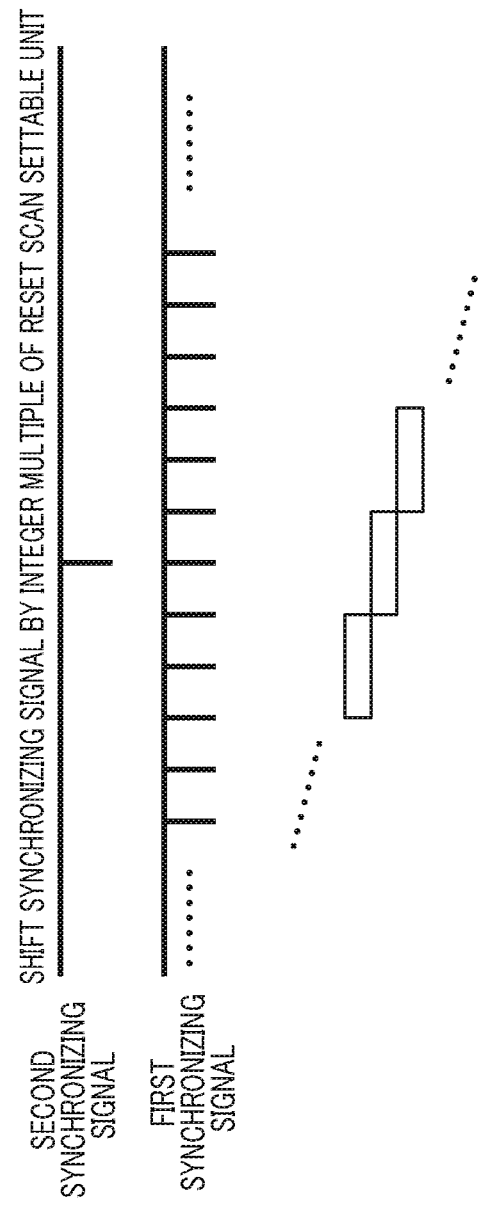

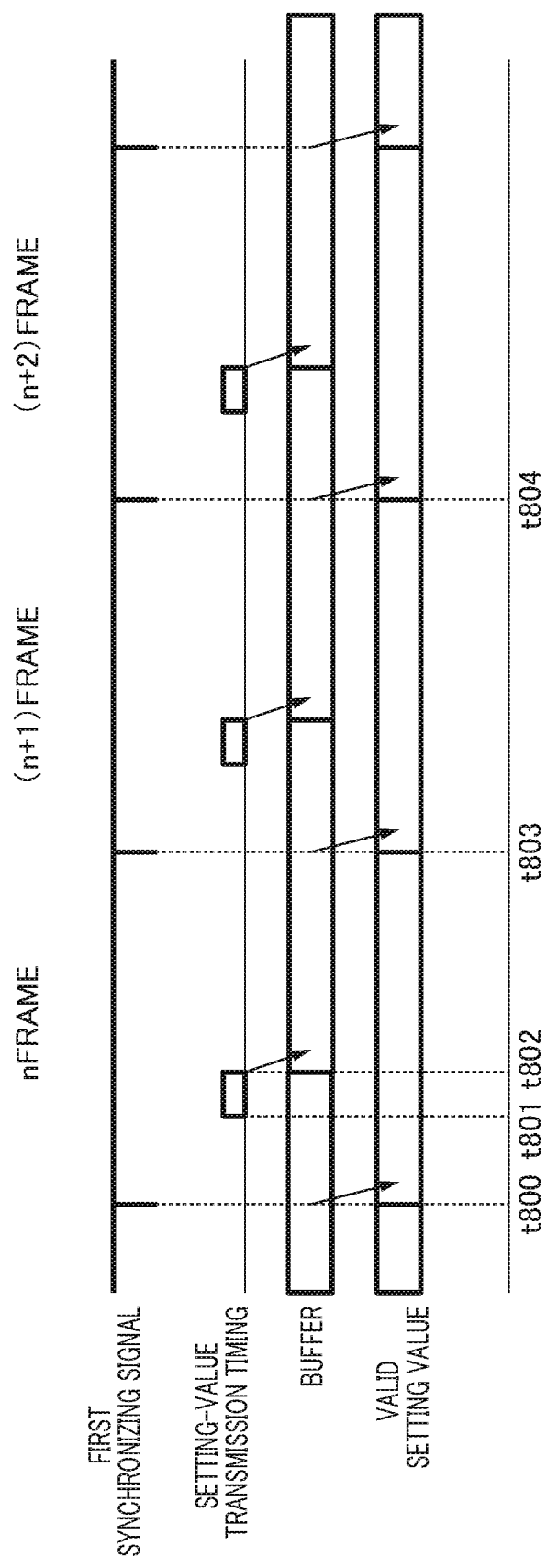

INFORMATION PROCESSING APPARATUS HAVING TWO MODULES THAT HAVE INDEPENDENT CLOCK SUPPLY SOURCES, CONTROL METHOD THEREFOR, AND STORAGE MEDIUM STORING CONTROL PROGRAM THEREFOR

BACKGROUND OF THE INVENTION

Field of the Invention

The present invention relates to an information processing apparatus having two modules that have independent clock supply sources, a control method therefor, and a storage medium storing a control program therefor.

Description of the Related Art

An amount of signals that are treated by a transmitting module of an information processing apparatus, which is an image sensor of an image pickup apparatus especially, per a definite period is increasing in recent years. There are some background factors, such as image quality enhancement and dynamic range enhancement of a static image and image quality enhancement and frame rate enhancement of a moving image. Accordingly, speeding up of data communication between an image sensor and a receiving module that receives and processes signals output from the image sensor is required more than ever. There are many methods for speeding up the data communication. In general, it is necessary to input a highly accurate clock to a communication circuit in order to achieve high-speed communication in a state with few transmission errors. In order to supply a highly accurate clock, accuracy of an oscillator that outputs the clock is required, and the distance between the oscillator and a module that demands the clock must not separate too much in order to reduce a loss.

For example, an image pickup apparatus may provide an oscillator on a substrate on which an image sensor is mounted and another oscillator on a substrate on which another module is mounted. However, it cannot be guaranteed that a clock frequency of an oscillator is integral multiple of a clock frequency of another oscillator in general. Moreover, even if clock frequencies of a plurality of oscillators are unified, a cycle of the clock for the image sensor may deviate from a cycle of the clock for the other module because change of a frequency of a clock that an oscillator outputs within a deviation range is allowed. Various solutions are proposed about this problem.

For example, Japanese Patent No. 5631084 discloses a technique that controls an image sensor to output frame data of a moving image at a frequency of a vertical synchronizing signal in an order of a scan line and detects a deviation between an output time of frame data and a reference output time of a display unit that displays the moving image. The technique solves the above-mentioned problem by changing an issue timing of the vertical synchronizing signal when the detected deviation exceeds a predetermined threshold.

Although the technique of the above-mentioned patent is capable of correcting the deviation between the reference output time and the output time of the frame data, the technique cannot correct the deviation between the image sensor and the receiving module when the receiving module is a module, such as a sound recording module, that operates regardless of the reference output time. That is, when an image sensor and another module are operated by clocks from independent clock supply sources, the conventional technique cannot correct deviation between the image sensor and the other module.

SUMMARY OF THE INVENTION

The present invention provides an information processing apparatus, a control method therefor, and a storage medium storing a control program therefor, which are capable of reducing deviation of cycles of two modules having independent clock supply sources.

Accordingly, a first aspect of the present invention provides an information processing apparatus including a first clock generator that generates a first clock, a second clock generator that generates a second clock, a first module, a second module that is different from the first module, a first timing controller that operates at the first clock, a second timing controller that operates at the second clock, a time measurement unit that measures times at which a synchronizing signal is supplied to the first module and the second module, a memory device that stores a set of instructions, and at least one processor that executes the set of instructions to control the first module to perform an operation in synchronization with a first synchronizing signal by supplying the first synchronizing signal from the first timing controller to the first module, control the second module to perform an operation in synchronization with a second synchronizing signal by supplying the second synchronizing signal from the second timing controller to the second module based on a first setting period, control the time measurement unit to measure a first time at which the first synchronizing signal is supplied to the first module and a second time at which the second synchronizing signal is supplied to the second module, calculate a time difference between the first time and the second time in a case where an operation mode of the first timing controller is switched to a second mode in which the first synchronizing signal is supplied to the first module based on a second setting period after synchronizing the first synchronizing signal with the second synchronizing signal in a first mode in which the first synchronizing signal is supplied to the first module in synchronization with the second synchronizing signal, and change the second setting period by a second period in a case where the time difference calculated is not less than a first period.

Accordingly, a second aspect of the present invention provides a control method for an information processing apparatus that includes a first clock generator that generates a first clock, a second clock generator that generates a second clock, a first module, a second module that is different from the first module, a first timing controller that operates at the first clock, a second timing controller that operates at the second clock, a time measurement unit that measures times at which a synchronizing signal is supplied to the first module and the second module, the control method comprising controlling the first module to perform an operation in synchronization with a first synchronizing signal by supplying the first synchronizing signal from the first timing controller to the first module, controlling the second module to perform an operation in synchronization with a second synchronizing signal by supplying the second synchronizing signal from the second timing controller to the second module based on a first setting period, controlling the time measurement unit to measure a first time at which the first synchronizing signal is supplied to the first module and a second time at which the second synchronizing signal is supplied to the second module, calculating a time difference between the first time and the second time in a case where an operation mode of the first timing controller is switched to a second mode in which the first synchronizing signal is supplied to the first module based on a second setting period after synchronizing the first synchronizing signal with the second synchronizing signal in a first mode in which the first synchronizing signal is supplied to the first module in synchronization with the second synchronizing signal, and changing the second setting period by a second period in a case where the time difference calculated is not less than a first period.

Accordingly, a third aspect of the present invention provides a non-transitory computer-readable storage medium storing a control program causing a computer to execute the control method of the second aspect.

According to the present invention, deviation of cycles of two modules having the independent clock supply sources can be reduced.

Further features of the present invention will become apparent from the following description of exemplary embodiments with reference to the attached drawings.

BRIEF DESCRIPTION OF THE DRAWINGS

FIG. 7A is a schematic view for describing a case where an issue timing of the first synchronizing signal is shifted by a unit of a horizontal synchronization period of an image sensor in FIG. 1 in a deviation correction process concerning a second embodiment.

FIG. 7B is a schematic view for describing a case where the issue timing of the first synchronizing signal is shifted by a settable unit of reset scan in the deviation correction process concerning the second embodiment.

FIG. 8 is a timing chart showing transmission timings of various setting values and timings at which the setting values become valid.

DESCRIPTION OF THE EMBODIMENTS

Figure 1:
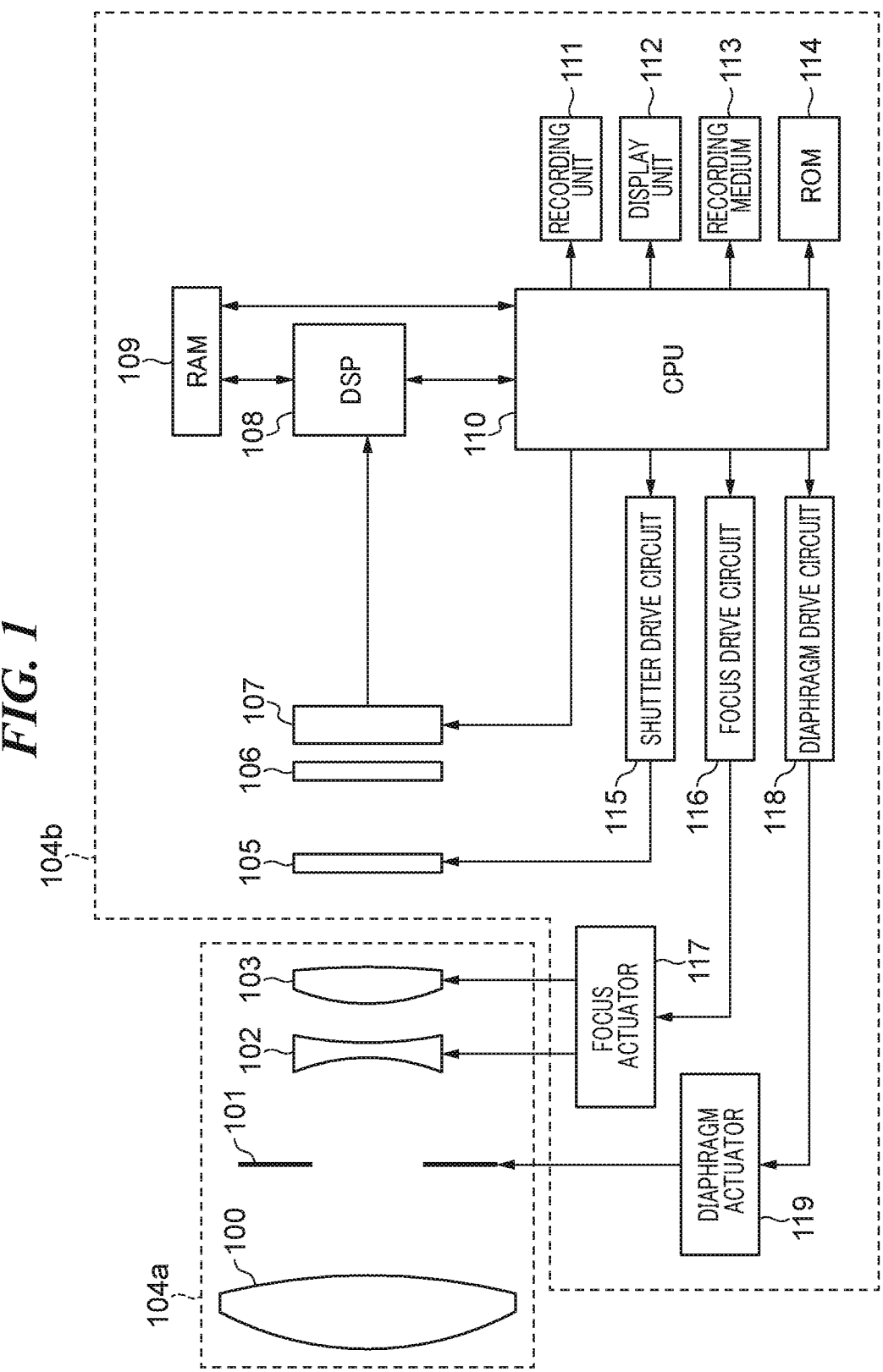
FIG. 1 is a block diagram schematically showing a configuration of an image pickup apparatus as an information processing apparatus concerning first, second, and third embodiments of the present invention.

Hereafter, embodiments according to the present invention will be described in detail by referring to the drawings. It should be noted that configurations shown in the following embodiments are mere examples and the present invention is not limited to the illustrated configurations.

FIG. 1 is a block diagram schematically showing an entire configuration of an image pickup apparatus as an information processing apparatus concerning a first embodiment.

As shown in FIG. 1, the image pickup apparatus consists of an image pickup optical system 104a and a body 104b. First, a configuration of the image pickup optical system 104a will be described. A first lens 100 is arranged at the front end of the image pickup optical system 104a. A diaphragm 101 adjusts a light amount at a time of capturing by adjusting an aperture diameter.

A second lens 102 and a third lens 103 is driven by a below-mentioned focus actuator 117 and adjusts a focus of the image pickup optical system 104a by moving in an optical axis direction.

Next, a configuration of the body 104b will be described. A focal-plane shutter 105 adjusts an exposure period at a time of capturing a static image. An optical low pass filter 106 is used to reduce false color and moire of a taken image.

An image sensor 107 (a first module) converts an optical image formed through the image pickup optical system 104a into an electrical signal (analog pixel signal), converts the analog pixel signal into digital image data depending on a predetermined quantifying bit number, and outputs the digital image data. The image sensor 107 of this embodiment is a CMOS image sensor equipped with a plurality of pixels in each of horizontal and vertical directions. The number of pixels is defined so as to be sufficient to a moving image of the 8K format. For example, the number of pixels is 32 million or more. Moreover, each pixel may be configured to provide a micro lens that improves a condensing efficiency and a plurality of photoelectric conversion parts. For example, when one pixel is configured to have two photoelectric conversion parts (dual pixel), a higher speed action is needed because an output signal amount increases by double of that of a single pixel.

A DSP 108 receives the image signal and applies an image process to the image signal. Moreover, the DSP 108 calculates parameters used for driving the image pickup optical system 104a on the basis of signals from the image sensor 107 besides the image process.

A RAM 109 combines a function to store the image data processed by the DSP 108 and a function of a work memory used when a below-mentioned CPU 110 operates. Although these functions are achieved using the RAM 109 in this embodiment, another type memory may be used as long as it has sufficiently high access speed and has no problem in an operation. Moreover, although the RAM 109 is arranged outside the DSP 108 and the CPU 110, a part or the whole of the functions of the RAM 109 may be built in the DSP 108 or the CPU 110.

The CPU 110 runs programs for controlling sections of the image pickup apparatus to totally control the image pickup apparatus. Moreover, the CPU 110 has a function to adjust the focus of the image pickup optical system 104a by controlling a below-mentioned focus driving circuit 116 using the calculated result output from the DSP 108.

A sound recording unit 111 (a second module) obtains audio data. The obtained audio data is processed and recorded by the CPU 110. A display unit 112 displays a still image and a moving image that are processed by the DSP 108, and displays a menu screen. A recording medium 113 is a detachable recording medium to which still image data and moving image data are recorded. A ROM 114 stores programs that the CPU 110 loads and runs in order to control actions of sections.

The shutter driving circuit 115 drivingly controls the focal-plane shutter 105. The focus drive circuit 116 is a focal position change unit that changes the focal position of the image pickup optical system 104a. The focus drive circuit 116 controls the focus actuator 117 according to the output of the CPU 110 to drive the second lens 102 and third lens 103 backward and forward in an optical axis direction so as to adjust the focus. A diaphragm drive circuit 118 controls a diaphragm actuator 119 to adjust an aperture of the diaphragm 101.

Figure 2:
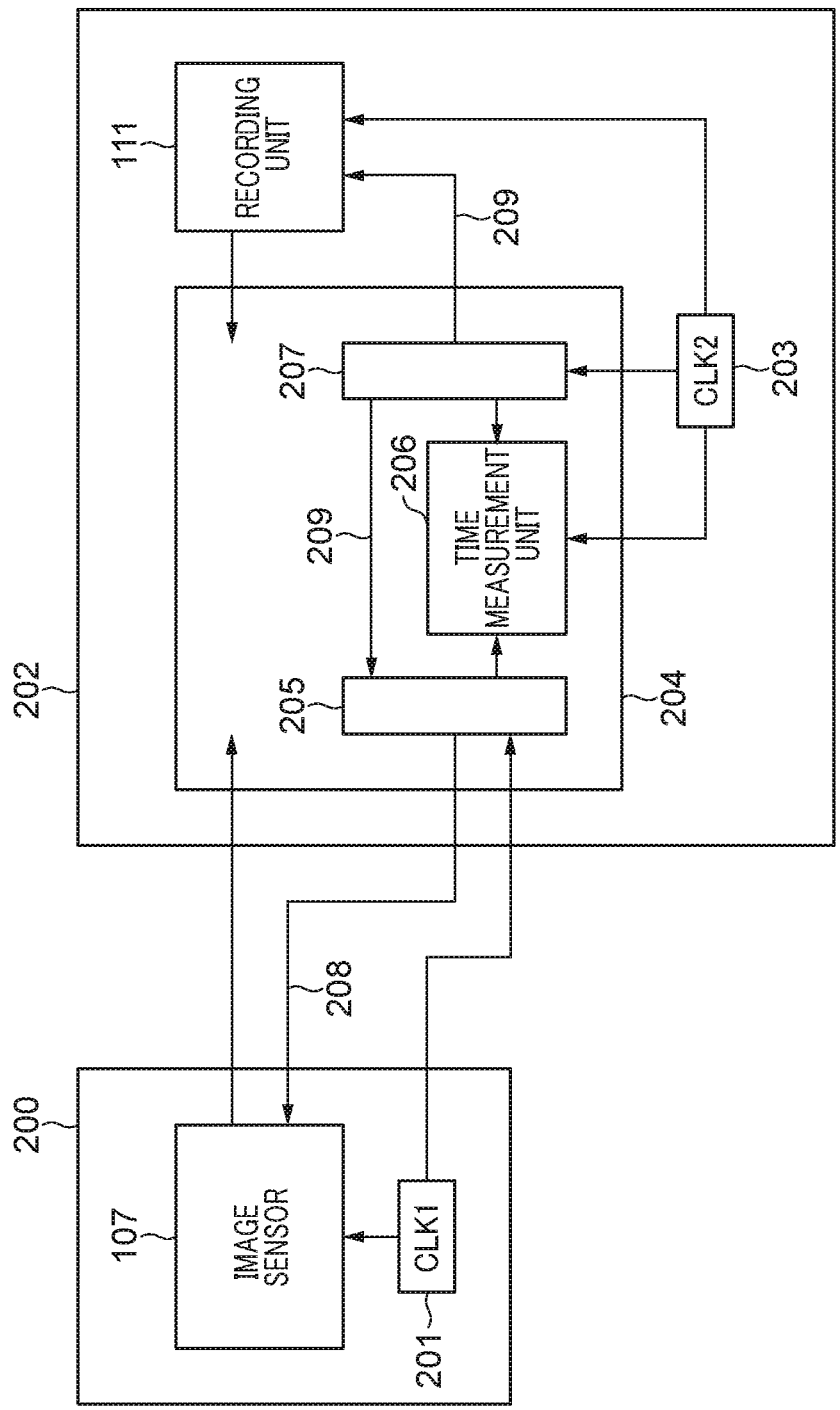
FIG. 2 is a substrate layout view of the image forming apparatus in FIG. 1.

FIG. 2 is a substrate layout view of the image forming apparatus in FIG. 1. It should be noted that only elements that are needed to describe the embodiment will be described and descriptions about other elements will be omitted.

The image sensor 107 and a first clock generator (CLK1) 201 that generates a first clock and consists of an oscillator, for example, are mounted on a first substrate 200. Since the image sensor 107 and the first clock generator 201 are mounted in the vicinity on the same substrate, a high-quality clock can be supplied to the image sensor 107.

The sound recording unit 111, a signal processing circuit 204, and a second clock generator (CLK2) 203 that generates a second clock and consists of an oscillator, for example, are mounted on a second substrate 202. The signal processing circuit 204 is an IC including the DSP 108 and the CPU 110 in FIG. 1. The signal processing circuit 204 includes a first synchronizing signal generation circuit 205 (first timing controller) that operates at the first clock, a second synchronizing signal generation circuit 207 (second timing controller) that operates at the second clock, and a time measurement unit 206. The first synchronizing signal generation circuit 205 can select whether to assert (supply) the first synchronizing signal 208 on the basis of a setting value (second setting period) from the CPU 110 or to assert the first synchronizing signal 208 in synchronization with a timing at which the second synchronizing signal 209 is asserted. The second synchronizing signal generation circuit 207 cannot perform such a selection but asserts the second synchronizing signal 209 on the basis of a setting value (a first setting period) from the CPU 110.

The image sensor 107 captures one frame of a moving image in synchronization with the first synchronizing signal 208 that is generated by the first synchronizing signal generation circuit 205, and outputs the obtained image data to the signal processing circuit 204. Since the clock for operating the first synchronizing signal generation circuit 205 that supplies the first synchronizing signal 208 to the image sensor 107 that outputs the image data is a high-quality clock generated from the first clock generator 201, the high-speed transmission of image data is available. It should be noted that the image data is transmitted using high-speed differential pairs with a plurality of lanes in order to keep the high-speed capability in this embodiment. A transmission clock in each lane is 4.8 GHz and is provided with communication band of about 3 Gbps or more.

Moreover, the first substrate 200 and the second substrate 202 are printed circuit boards, such as glass epoxy boards, and the substrates are connected by a flexible substrate that is configured by forming wirings on a base made of a film of polyimide or polyester. It should be noted that the configurations and the materials of the substrates are not limited to the above-mentioned examples. A flexible substrate may be used in place of the glass epoxy board and the substrates may be connected with wires.

The sound recording unit 111 records sound corresponding to one frame of the moving image captured by the image sensor 107 in synchronization with the second synchronizing signal 209 that is generated by the second synchronizing signal generation circuit 207, and outputs the obtained audio data to the signal processing circuit 204. Since the clock for operating the second synchronizing signal generation circuit 207 that supplies the first synchronizing signal 209 to the sound recording unit 111 that outputs the audio data is a high-quality clock generated from the first clock generator 203, the high-speed transmission of audio data is available.

The time measurement unit 206 measures times at which the first and second synchronizing signals 208 and 209 are asserted.

Figure 3:
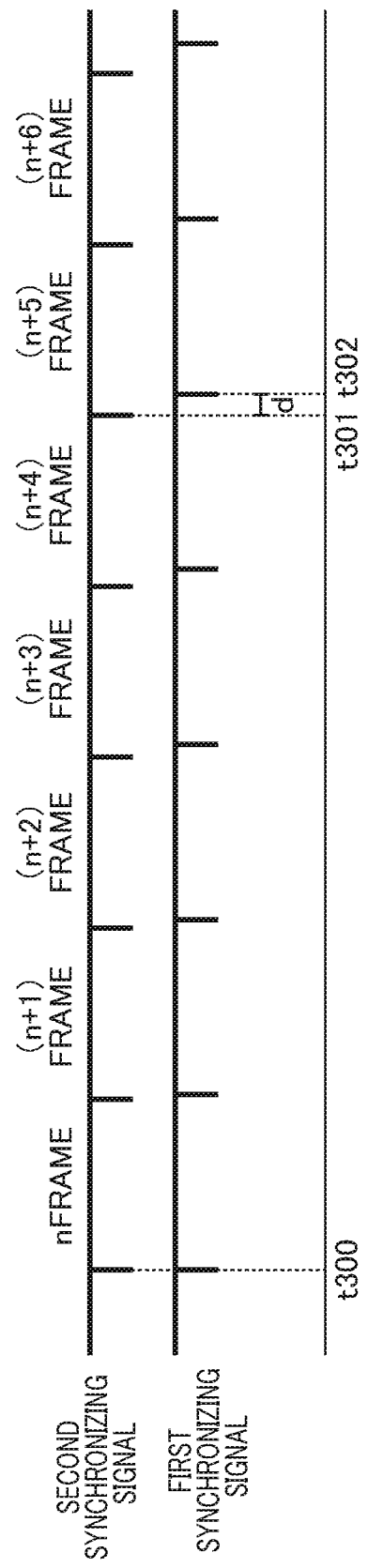
FIG. 3 is a timing chart for describing a principle of occurrence of deviation of issue timings of first and second synchronizing signals in FIG. 2.

Hereinafter, timing control about capture of a moving image and recording of sound will be described in detail. FIG. 3 is a timing chart for describing a principle of occurrence of deviation of issue timings of first and second synchronizing signals 208 and 209.

In this example, the timings at which the first synchronizing signal 208 and the second synchronizing signal 209 are asserted coincide completely at the time t300. However, since set frequencies of the first clock generator 201 and second clock generators 203 are different in general, operating frequencies after that do not coincide completely. Moreover, even if the set frequencies of the first clock generator 201 and second clock generator 203 are identical, the operation frequencies will differ within a range of deviation. Accordingly, while frames are continuously captured from the time t300, a time lag (a deviation) of one frame will be accumulated.

For example, at a head of a (n+5)th frame (n is one or more integer), the first synchronizing signal 208 is asserted at the time t301 and the second synchronizing signal 209 is asserted at the time t302. That is, a time lag d is accumulated at the head of the (n+5)th frame.

When such a time lag is accumulated, a sound and a moving image will be recorded in a state where their timings are deviated in the moving image file that the image pickup apparatus finally records. Accordingly, the deviation is corrected using the following deviation correction process shown in FIG. 4 in this embodiment.

Figure 4:
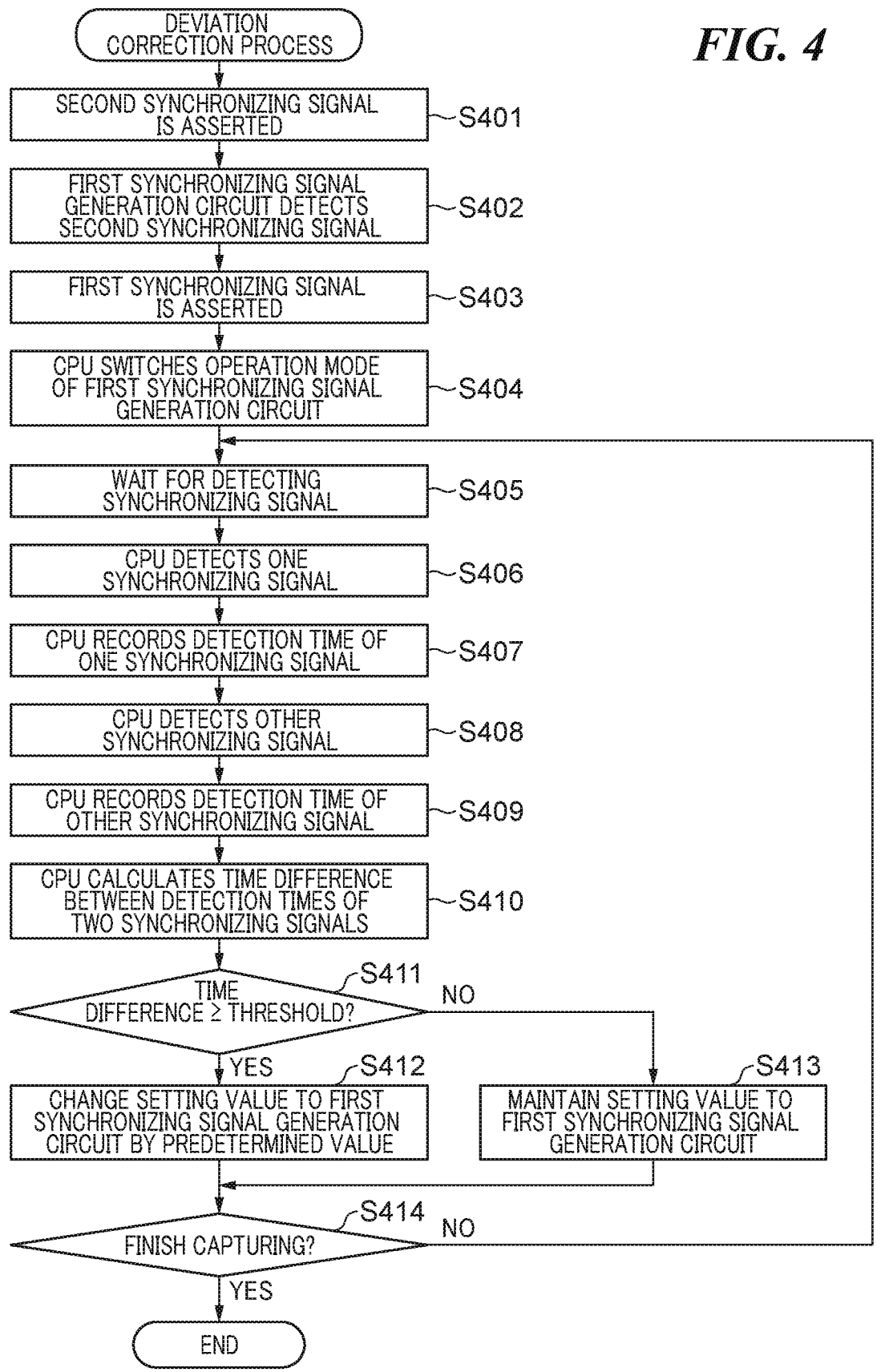
FIG. 4 is a flowchart showing a deviation correction process in the first embodiment.

FIG. 4 is a flowchart showing the deviation correction process in the first embodiment. In this process, a deviation is detected from a capturing start of a moving image until a capturing end of the moving image, and a setting value that defines a timing at which the first synchronizing signal 208 is asserted is changed.

First, when capturing of a moving image is started, the progress proceeds to step S401 and the second synchronizing signal generation circuit 207 asserts the second synchronizing signal. In step S402, the first synchronizing signal generation circuit 205 detects the second synchronizing signal 209.

Immediately after that, in step S403, the first synchronizing signal generation circuit 205 asserts the first synchronizing signal 208 in synchronization with the detected second synchronizing signal 209.

Then, in step S404, the CPU 110 switches an operation mode of the first synchronizing signal generation circuit 205 (switching unit). That is, the operation mode of the first synchronizing signal generation circuit 205 is switched from a first mode in which the first synchronizing signal 208 is asserted in synchronization with the second synchronizing signal 209 to a second mode in which the first synchronizing signal 208 is asserted on the basis of a setting value from the CPU 110. The above-mentioned operation enables to synchronize the timings at which the first synchronizing signal 208 and second synchronizing signal 209 are asserted at the capturing start timing.

In step S405, the CPU 110 goes in a state waiting for detecting a synchronizing signal. When detecting that one of the first and second synchronizing signals 208 and 209 is asserted in step S406, the CPU 110 reads the time at which the one synchronizing signal is detected (asserted) from the time measurement unit 206 and records it in step S407.

When detecting that the other of the first and second synchronizing signals 208 and 209 is asserted in step S408, the CPU 110 reads the time at which the other synchronizing signal is detected (asserted) from the time measurement unit 206 and records it in step S409.

After that, in step S410, the CPU 110 calculates a time difference between the times at which the first and second synchronizing signals 208 and 209 are detected from the times recorded in the steps S407 and S409.

In step S411, the CPU 110 determines whether the calculated time difference is equal to or more than a threshold Δ (a first period). When the calculated time difference is equal to or more than the threshold Δ, the CPU 110 (change unit) changes the setting value about an assertion timing of the first synchronizing signal 208 set to the first synchronizing signal generation circuit 205 by a predetermined value. That is, the CPU 110 controls the first synchronizing signal generation circuit 205 so as to shift the assertion timing of the first synchronizing signal 208. In this embodiment, the predetermined value is equal to the threshold Δ. In the meantime, when the calculated time difference is less than the threshold Δ, the CPU 110 maintains the setting value to the first synchronizing signal generation circuit 205 in step S413. That is, the CPU 110 controls the first synchronizing signal generation circuit 205 so as to maintain the assertion timing of the first synchronizing signal 208.

After the step S412 or S413, the CPU 110 determines whether the capturing is finished in step S414. When not finishing the capturing, the CPU 110 returns the process to the step S405 and goes in the state waiting for detecting the following synchronizing signal. In the meantime, when finishing the capturing, the CPU 110 finishes capturing the moving image and finishes this process.

Figure 5:
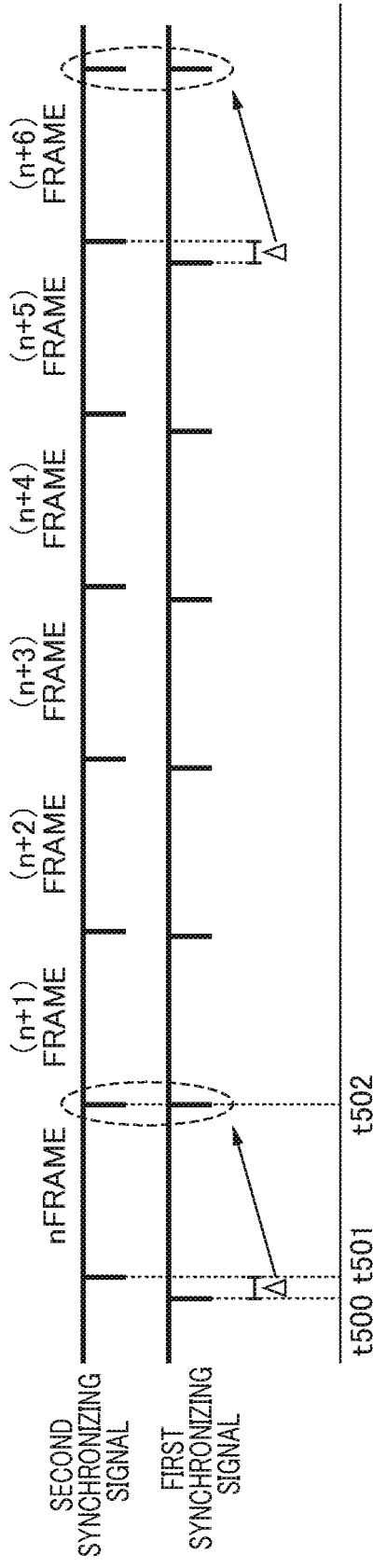
FIG. 5 is a timing chart showing a circumstance in which the deviation of issue timings of the first and second synchronizing signals is corrected by the deviation correction process in FIG. 4.

FIG. 5 is a timing chart showing a circumstance in which the deviation of issue timings of the first and second synchronizing signals is corrected by the deviation correction process in FIG. 4.

At the head of the n-th frame, the first synchronizing signal 208 is asserted at the time t500. The CPU 110 reads the time measured by the time measurement unit 206 when the assertion is detected and the time is recorded by the CPU 110.

The second synchronizing signal 209 is asserted at the time t501. The CPU 110 reads the time measured by the time measurement unit 206 when the assertion is detected and the time is recorded by the CPU 110.

The CPU 110 calculates the time difference between the recorded times, and compares the calculated time difference with the threshold Δ. Since the calculated time difference is equal to the threshold Δ in this embodiment, the process proceeds to step S412 in FIG. 4.

The CPU 110 changes the setting value of the issue timing of the first synchronizing signal 208 set to the first synchronizing signal generation circuit 205 by the threshold Δ. Thereby, the timing at which the first synchronizing signal 208 is asserted is changed only in the (n+1)th frame. As a result, the timings at which the first synchronizing signal 208 and the second synchronizing signal 209 are asserted accord at the time t502 of the head of the (n+1)th frame.

Since the time difference between the timings at which the first and second synchronizing signals 208 and 209 are asserted becomes equal to or more than the threshold Δ at a head of a (n+6)th frame again, the time difference is corrected at a head of a (n+7)th frame by the same procedure.

As described above, this embodiment is able to reduce a deviation of operation timings resulting from a difference or a deviation of frequencies of a plurality of independent clock generators. Accordingly, for example, a deviation between a timing about capturing of a moving image and a timing about audio recording can be kept within a certain time difference (the threshold Δ in this embodiment). It should be noted that the first synchronizing signal 208 and the second synchronizing signal 209 are vertical synchronizing signals that prescribe frame obtainment timings and are asserted in a cycle of about 1/60 seconds in this embodiment. A target synchronizing signal is not limited to a vertical synchronizing signal. A horizontal synchronizing signal of which unit is a line may be a target. Moreover, the cycle of the vertical synchronizing signal may be shorter than 1/60 seconds. For example, it may be 1/120 seconds.

Furthermore, although the timing of the capturing of a moving image by the image sensor 107 and the timing of the recording of the sound by the sound recording unit 111 are synchronized in this embodiment, the present invention is not limited to this. For example, the deviation correction process in FIG. 4 may be executed when the display unit 112 performs live view display corresponding to one frame of a moving image captured by the image sensor 107 in synchronization with the synchronizing signal generated by the second synchronizing signal generation circuit 207. Thereby, the deviation between a timing of the capturing of a moving image by the image sensor 107 and a timing of the live view display by the display unit 112 can be kept within a certain time difference.

Figure 11:
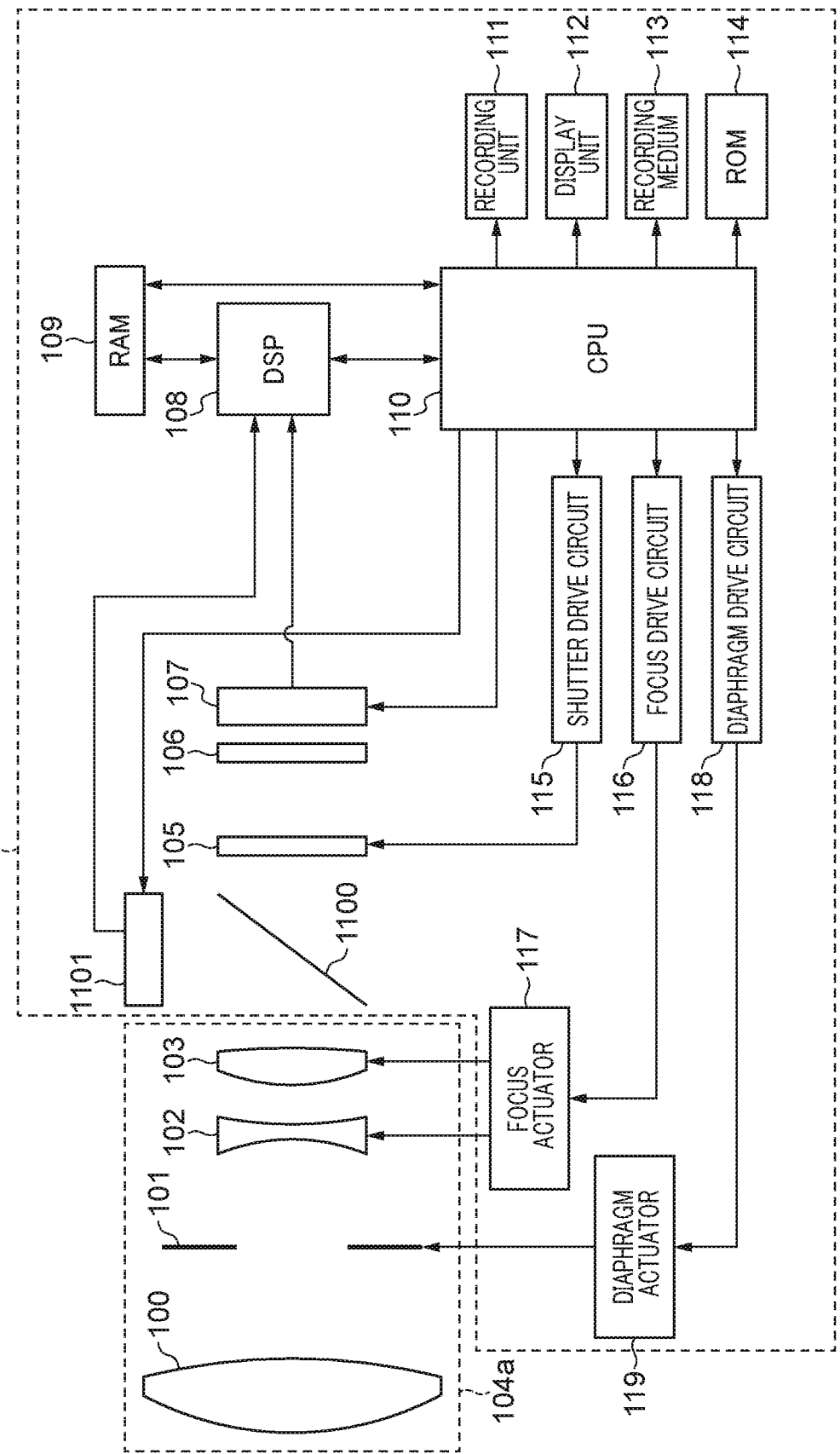
FIG. 11 is a block diagram schematically showing an entire configuration of an image pickup apparatus as an information processing apparatus concerning a fourth embodiment.

Moreover, the image pickup apparatus may have a second image sensor 1101 at a position of which an optical distance from an object is equal to that of the image sensor 107 as shown in FIG. 11 mentioned later. In this case, the second image sensor 1101 may perform a capturing operation corresponding to one frame of a moving image captured by the image sensor 107 in synchronization with the synchronizing signal generated by the second synchronizing signal generation circuit 207. That is, the deviation correction process in FIG. 4 is applicable to a module that operates in synchronization with a synchronizing signal that is independent from the synchronizing signal to which the image sensor 107 synchronizes. Accordingly, the deviation between the operation timing of the module and the operation timing of the image sensor 107 can be kept below a certain value.

In addition, although the image sensor 107 captures a moving image in this embodiment, the present invention is not limited to this. For example, the deviation correction process in FIG. 4 may be executed in a case where the image sensor 107 continuously captures high-definition static images or static images of a high dynamic range and the display unit 112 performs live view display at the same time. Moreover, the target may be a module other than the image sensor 107 as long as the module cyclically outputs signals to the signal processing circuit 204 in synchronization with the first synchronizing signal 208 generated by the first synchronizing signal generation circuit 205. For example, the deviation correction process in FIG. 4 may be executed in a case where the image sensor 107 in FIG. 2 is replaced by a communication unit that connects to a network and the display unit 112 reproduces and displays a moving image that the communication unit receives via the network.

Next, a second embodiment of the present invention will be described. Since a hardware configuration of the second embodiment is the same as that of the first embodiment, the same reference numeral is given to the same component and a duplicated description is omitted.

For example, when the image sensor 107 is a CMOS image sensor, a moving image is obtained by a slit rolling action that exposes for a line and reads in order from the upper portion of the image sensor 107, in general. When an image is obtained by the slit rolling action, it is necessary to perform a reset scan and a read scan sequentially from the upper portion of the image sensor 107 at an integral multiple cycle of a certain scanning cycle.

Figure 6:
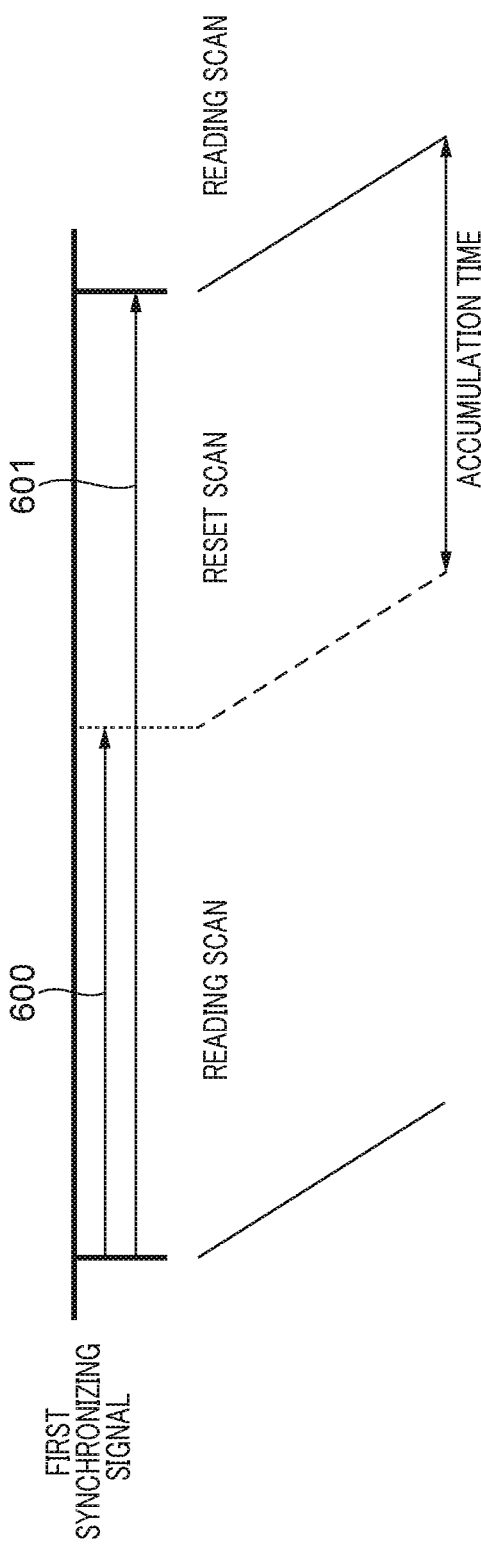
FIG. 6 is a timing chart for describing control of an accumulation period by a slit rolling action.

FIG. 6 is a timing chart for describing control of an accumulation period by the slit rolling action.

The read scanning of the image sensor 107 is performed in synchronization with the first synchronizing signal 208. In a case where a reset scan start period 600 is set to the image sensor 107 from the CPU 110, the reset scan starts at a reset scan start timing when the reset scan start period 600 elapses after the first synchronizing signal 208 is input into the image sensor 107.

Moreover, when a vertical size period 601 is set to the first synchronizing signal generation circuit 205 from the CPU 110, the following synchronizing signal is output at a timing when the vertical size period 601 elapses after the first synchronizing signal is input into the image sensor 107. An accumulation period is controlled using these periods by subtracting the reset scan start period 600 from the vertical size period 601.

In the first embodiment, the change amount about the timing of asserting the first synchronizing signal 208 is equal to the threshold Δ. When this change amount is not an integral multiple of the above-mentioned certain scanning period, the period of the reset scan or the read scan differs from the above-mentioned certain scanning period in a certain one line in the image sensor 107, which may cause difference in an exposure amount in an image before and after that line. Accordingly, this embodiment restricts the amount that the CPU 110 changes the timing of asserting the first synchronizing signal 208 by methods shown in FIG. 7A, FIG. 7B, and FIG. 7C. This prevents the exposure difference in an image obtained by the slit rolling action even when the time difference between the first and second synchronizing signals 208 and 209 is reduced.

FIG. 7A is a schematic view for describing a case where an issue timing of the first synchronizing signal 208 is shifted by an integral multiple of the horizontal synchronization period (HD), which shows a cycle of the horizontal synchronization signal of the image sensor 107, in the deviation correction process concerning the second embodiment.

The CPU 110 sets the setting value for the issue timing of the first synchronizing signal 208 by shifting by an integral multiple of the HD as shown in FIG. 7A and transmits the setting value to the first synchronizing signal generation circuit 205. This prevents the occurrence of the deviation in the cycle of the reset scan before and after the issue of the first synchronizing signal 208.

FIG. 7B is a schematic view for describing a case where the issue timing of the first synchronizing signal is shifted by a settable unit of the reset scan in the deviation correction process concerning the second embodiment.

Hereinafter, a case where the settable unit of the reset scan is a half of the HD by devising the circuit configuration of the image sensor 107 will be shown. In this case, the period required for the reset scan of a certain line becomes twice the settable unit of the reset scan.

In such a case, the accumulation period can be decided in more detail. Specifically, the CPU 110 sets the setting value for the issue timing of the first synchronizing signal 208 by shifting by an integral multiple of the settable unit of the reset scan as shown in FIG. 7B and transmits the setting value to the first synchronizing signal generation circuit 205. As a result of this, even when the first synchronizing signal 208 is asserted during the reset scan of a certain line, the occurrence of the deviation in the cycle of the reset scan before and after the assertion is prevented, which can avoid bad influence on the image quality.

Moreover, when the timing of asserting the first synchronizing signal 208 is changed in this way while a moving image is obtained by the slit rolling action, a difference occurs in the accumulation period unless the reset scan start timing is changed. Accordingly, the reset scan start timing is shifted by the same amount as the change amount of the timing of asserting the first synchronizing signal 208.

Figure 7C:
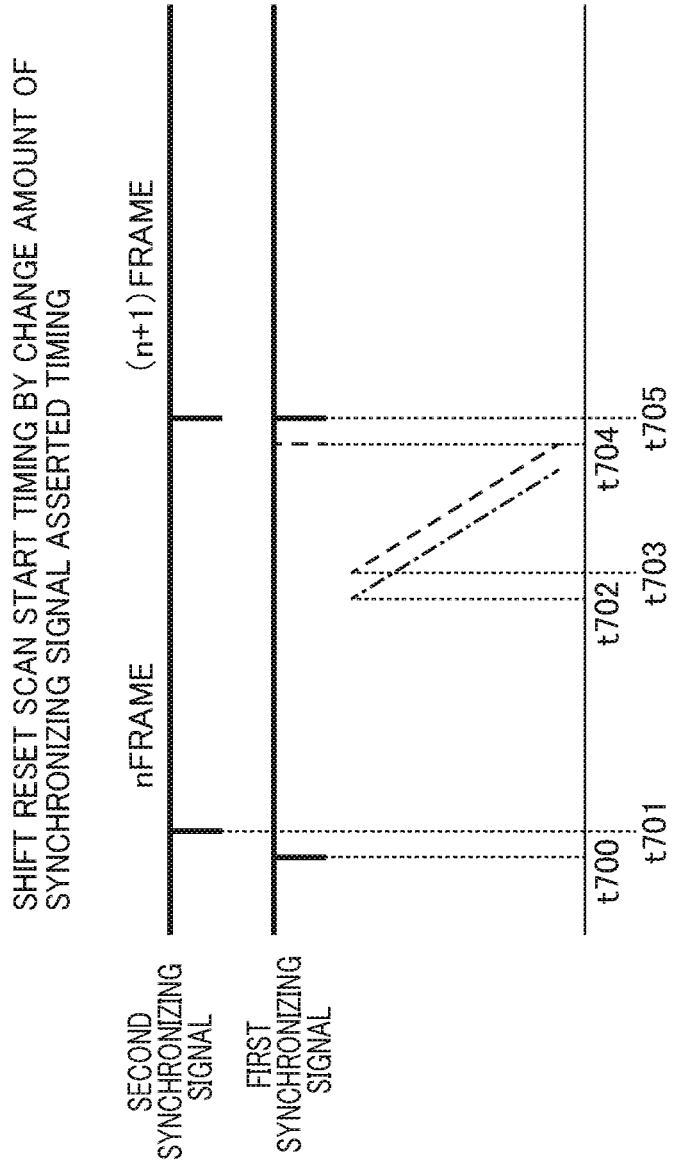
FIG. 7C is a timing chart showing a circumstance in which a reset scan start timing is shifted by a change amount of a timing at which the first synchronizing signal is asserted in the deviation correction process concerning the second embodiment.

Specifically, as shown in a timing chart of FIG. 7C, the first synchronizing signal 208 of the n-th frame is asserted at the time t700 and the time is recorded by the CPU 110. The second synchronizing signal 209 is asserted at the time t701, and the time is recorded by the CPU 110.

The CPU 110 calculates a time difference between the times at which the first and the second synchronizing signals 208 and 209 of the n-th frame are asserted. Hereinafter, a case where the calculated time difference becomes equal to or more than the threshold Δ will be described. In this case, the CPU 110 changes the timing at which the first synchronizing signal 208 of a (n+1)th frame is asserted to the time t705 that is shifted from an initial time t704 by a predetermined amount (an integral multiple of the settable unit of the reset scan). Moreover, the CPU 110 changes the reset scan start timing of the n-th frame to the time 1703 that is shifted from an initial time t702 by the above-mentioned predetermined amount. Since the reset scan start timing is changed in this way, the accumulation period is controllable so as not to be changed even if the timing of asserting the first synchronizing signal 208 is changed.

As described above, since the shift amount of the first synchronizing signal 208 is controlled appropriately in this embodiment, the shift of the first synchronizing signal 208 does not affect the obtainment of an image by the slit rolling action.

Next, a third embodiment of the present invention will be described. Since a hardware configuration of the second embodiment is the same as that of the first embodiment, the same reference numeral is given to the same component and a duplicated description is omitted.

In the second embodiment, the setting value from the CPU 110 to the first synchronizing signal generation circuit 205 is changed by the predetermined amount in the frame in which the time difference between the synchronizing signals is detected to be equal to or more than the threshold Δ, and the timing of the first synchronizing signal 208 asserted soon after that is changed. However, such a configuration restricts the timing at which the setting value is transmitted. For example, a case where the reset scan start period 600 is set as a very short value in the configuration that obtains a moving image by the slit rolling action is considered. Since it takes a period to calculate the reset scan start period 600, a problem that the completion timing of calculation is later than a timing at which the reset scan should start may occur. Accordingly, this embodiment prevents such a problem by shifting a timing to set from a timing at which setting is reflected.

FIG. 8 is a timing chart showing transmission timings of various setting values by the CPU and timings at which the setting values become valid in the first synchronizing signal generation circuit 205.

In this embodiment, the various setting values mean either of the following three setting values. The first setting value is a setting value of the issue timing of the first synchronizing signal 208 that the CPU 110 sets to the first synchronizing signal generation circuit 205. The second setting value is a setting value of the issue timing of the second synchronizing signal 209 that the CPU 110 sets to the second synchronizing signals generation circuit 207. The third setting value is a setting value about the reset scan start period 600 that the CPU 110 sets to the image sensor 107.

When the first synchronizing signal 208 is asserted at the time t800, the setting value currently held in a buffer of the first synchronizing signal generation circuit 205 becomes a valid setting value.

Next, the CPU 110 starts to transmit the setting values to the first and second synchronizing signal generation circuits 205 and 207 and the image sensor 107 at the time t801. The setting values are calculated on the basis of a calculation result of the time difference between the times at which the first and second synchronizing signals 208 and 209 in the n-th frame are detected. This transmission is completed at the time t802. A buffer of each of the first and second synchronizing signal generation circuits 205 and 207 and the image sensor 107 holds the new setting value transmitted.

When the first synchronizing signal 208 of the (n+1)th frame is asserted on the basis of the above-mentioned valid setting value at the time t803, the valid setting value is updated with the new setting value held in the buffer of the first synchronizing signal generation circuit 205 at the time t802. Namely, the setting values that the CPU 110 transmits from the time t801 to the time t802 become various valid setting values at the time t803.

Since the reflecting timing of the setting values is shifted by one frame in this way, the accumulation period etc. can be appropriately set.

The deviation correction process concerning this embodiment will be described by referring to flowcharts in FIG. 9A and FIG. 9B. It should be noted that a step in the flowcharts in FIG. 9A and FIG. 9B that performs the same process as the step in the flowchart in FIG. 4 indicated by the same reference numeral. These flowcharts differ from the flowchart in FIG. 4 in that steps that turn a detection flag ON and OFF are added.

Figure 9A:
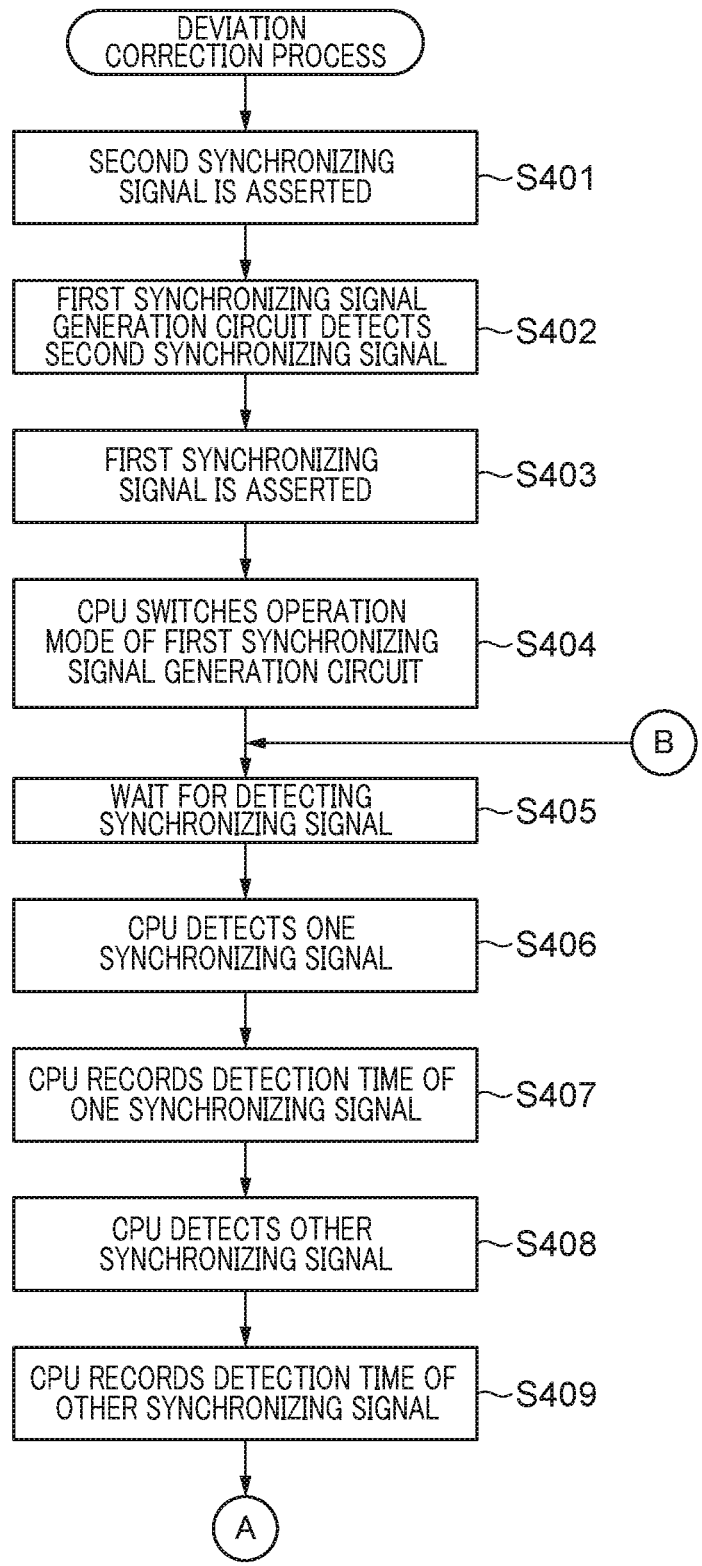
FIG. 9A is a flowchart showing a part of a deviation correction process concerning a third embodiment.
Figure 9B:
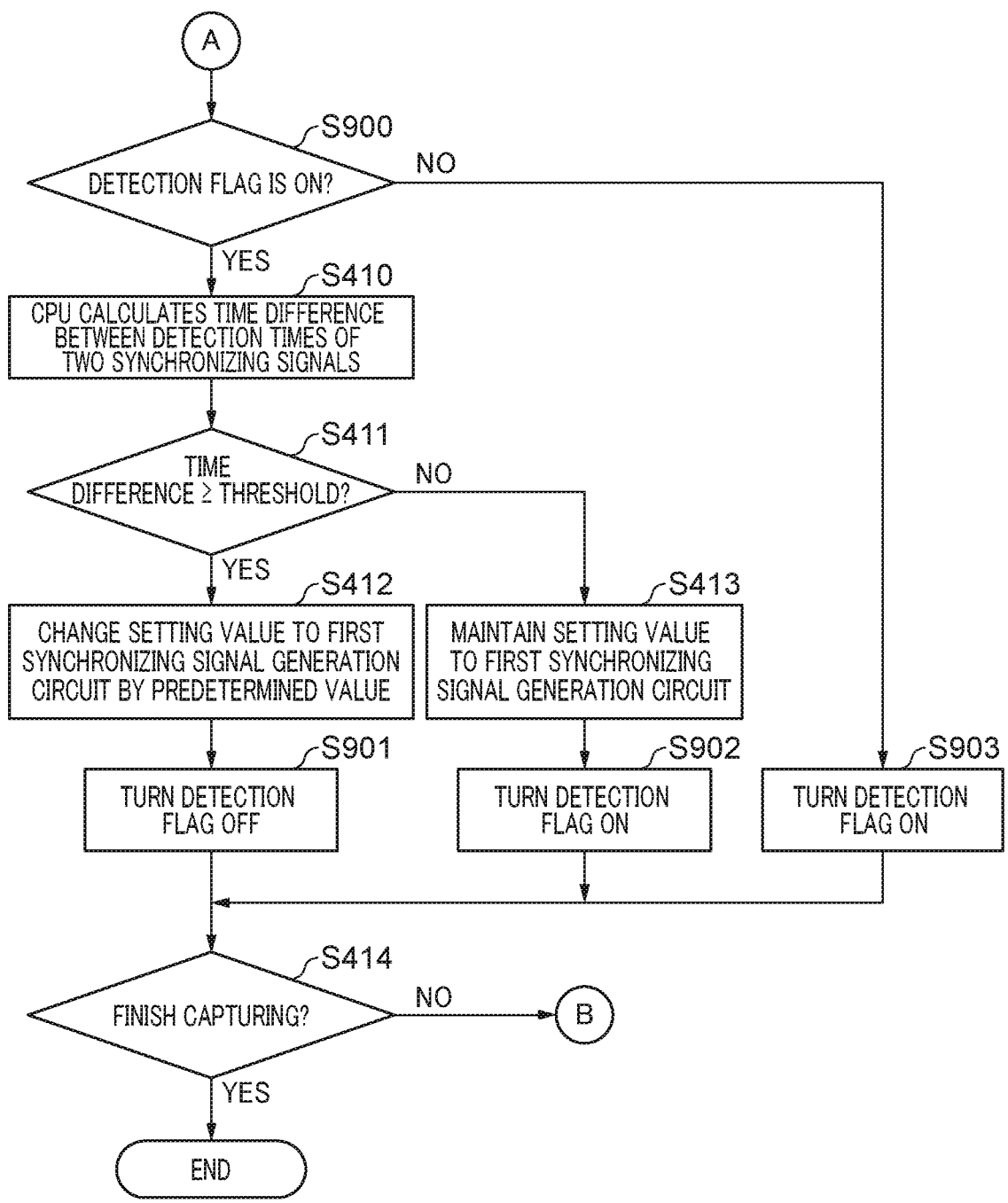
FIG. 9B is a flowchart showing of a continuous part of the deviation correction process in FIG. 9A.

After a plurality of synchronizing signals are detected and times at which these signals are asserted are recorded in a certain frame, the CPU 110 ascertains whether the detection flag is ON or OFF in step S900 as shown in FIG. 9B. As a result of this ascertainment, when the detection flag is OFF, the CPU 110 turns the detection flag ON in step S903, finishes the process of that frame, and proceeds with the process to step S414.

In the meantime, when the detection flag is ON as a result of the ascertainment in the step S900, the CPU 110 proceeds with the process to the step S410 and calculates the time difference between the times at which the first and second synchronizing signals 208 and 209 are detected. When it is determined that the calculated time difference is equal to or more than the threshold Δ in the step S411, the CPU 110 changes the setting value about an assertion timing of the first synchronizing signal 208 set to the first synchronizing signal generation circuit 205 by a predetermined value in the step S412. Then, the CPU 110 turns the detection flag OFF in step S901, finishes the process for the current frame, and proceeds with the process to the step S414. When it is determined that the calculated time difference is less than the threshold Δ in the step S414, the CPU 110 maintains the setting value to the first synchronizing signal generation circuit 205 without changing in step S413. Then, the CPU 110 turns the detection flag ON in step S902, finishes the process for the current frame, and proceeds with the process to the step S414.

Figure 10A:
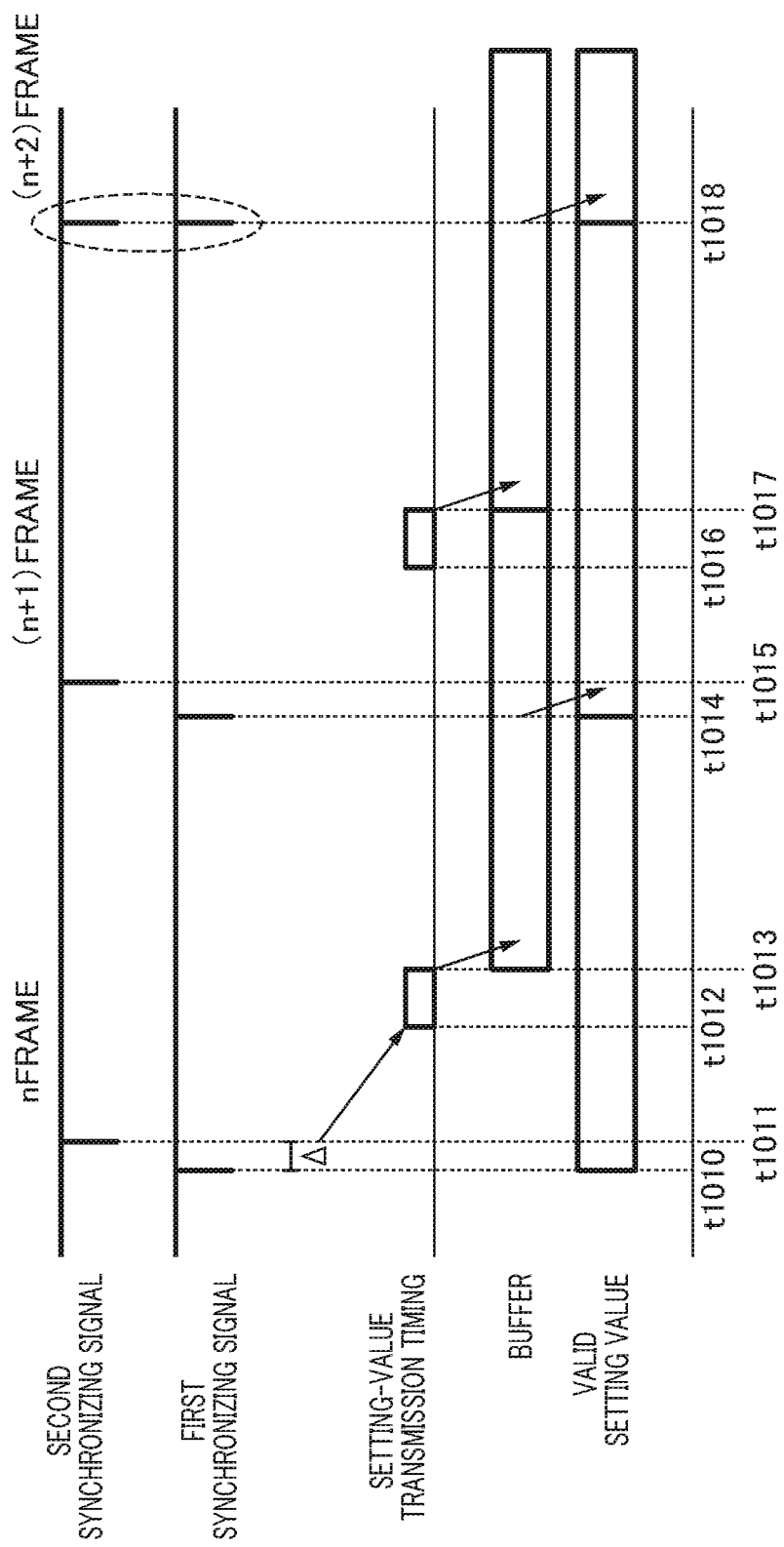
FIG. 10A is a timing chart showing a circumstance in which the deviation of the issue timings of the first and second synchronizing signals is corrected by the deviation correction process in FIG. 9A and FIG. 9B.

FIG. 10A is a timing chart showing a circumstance in which the deviation of the issue timings of the first and second synchronizing signals 208 and 209 is corrected by the deviation correction process in FIG. 9A and FIG. 9B.

When the first synchronizing signal 208 of the n-th frame is asserted at the time t1010 and the second synchronizing signal 209 of the n-th frame is asserted at the time t1011, the process of the flowchart in FIG. 9A and FIG. 9B has been executed to the step S409. In the following step S900, the CPU 110 checks whether the detection flag is set to ON. Here, the detection flag shall be ON. Then, the process proceeds to the step S410 in FIG. 9B, and the CPU 110 calculates the time difference between the times at which the first and second synchronizing signals 208 and 209 are detected by the method disclosed in the first embodiment.

Hereinafter, a case where the calculated time difference becomes equal to or more than the threshold Δ will be described. In this case, the determination in the step S411 in FIG. 9B becomes YES, and the process proceeds to the step S412. The CPU 110 changes the setting value about the assertion timing of the first synchronizing signal 208 by the unit of the integral multiple of one HD so as to minimize the deviation from the second synchronizing signal 209, and starts to transmit the setting value to the first synchronizing signal generation circuit 205 at the time t1012. When the transmission is completed at the time t1013, the setting value is held in the buffer of the first synchronizing signal generation circuit 205. Then, the CPU 110 turns the detection flag OFF in the step S901 and finishes the process for the n-th frame.

When the first synchronizing signal 208 of the (n+1)th frame is asserted at the time t1014, the first synchronizing signal generation circuit 205 sets the setting value that has been held in its buffer at the time t1013 as the valid setting value. When the second synchronizing signal 209 is asserted at the time t1015, the process of the flowchart in FIG. 9A and FIG. 9B has been executed to the step S409 again. In the following step S900, the CPU 110 checks whether the detection flag is set to ON. Since the process for the n-th frame has passed the step S901, the detection flag is OFF. Accordingly, the process proceeds to step S903, and the CPU 110 turns the detection flag ON and finishes the process for the (n+1)th frame.

In this case, the CPU 110 does not change the various setting values. That is, the setting value transmitted to the first synchronizing signal generation circuit 205 from the CPU 110 from the time t1016 to the time t1017 is the same as the setting value transmitted to the first synchronizing signal generation circuit 205 from the CPU 110 from the time t1012 to the time t1013. Accordingly, the setting value held in the buffer of the first synchronizing signal generation circuit 205 at the time t1017 becomes the valid setting value at the timing at which the first synchronizing signal 208 of a (n+2)th frame is asserted at the time t1018. This setting value is the same as the setting value that the CPU 110 has transmitted to the first synchronizing signal generation circuit 205 at time t1012. Moreover, since the timing of this setting value has been corrected, the deviation between the first synchronizing signal 208 and the second synchronizing signal 209 is minimized at this time.

The description by referring to FIG. 10A pays attention to the assertion timing of the synchronizing signal only. However, in the system that obtains a moving image by the slit rolling action, a reflection timing of a reset scan should be different from a setting timing.

Figure 10B:
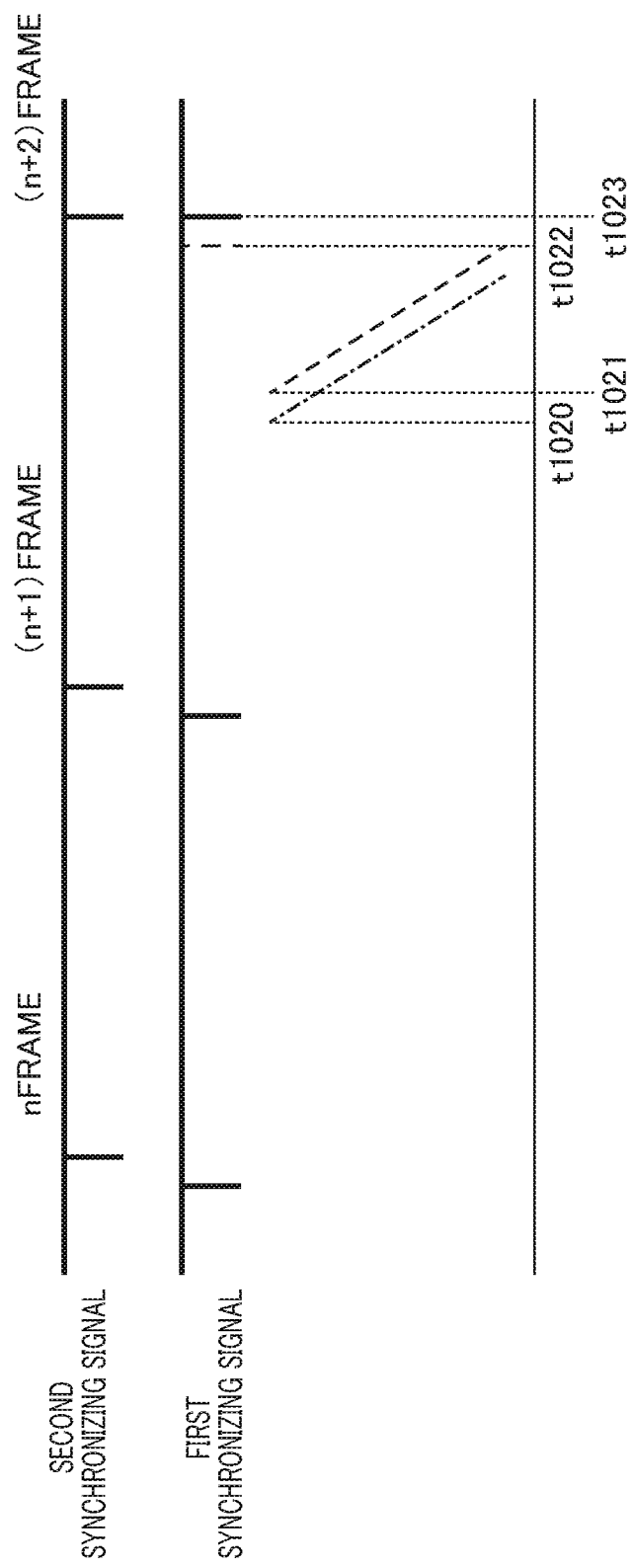
FIG. 10B is a timing chart showing a circumstance in which a reset scan start timing is shifted by a change amount of a timing at which the first synchronizing signal is asserted in the deviation correction process in FIG. 9A and FIG. 9B.

Accordingly, as shown in a timing chart in FIG. 10B, the issue timing of the first synchronizing signal 208 of the (n+2)th frame is shifted to the time t1023 from the time t1022 on the basis of the setting value that the CPU 110 transmits to the first synchronizing signal generation circuit 205 in the n-th frame.

In the meantime, the image sensor 107 sets the setting value that has been transmitted to the image sensor 107 from the CPU 110 in the n-th frame and has been held in its buffer as the valid setting value at the timing of asserting the first synchronizing signal 208 of the (n+1)th frame. The image sensor 107 shifts the reset scan start timing of the (n+1)th frame by the same time difference between the time t1022 and the time t1023 by using the valid setting value. In the example in FIG. 10B, the reset scan start timing of the (n+1)th frame is shifted to the time t1021 from the time t1021 that is a timing before correcting the deviation. This control is capable of canceling the deviation while keeping an accumulation period constant.

According to this embodiment, the CPU 110 delays the timing at which the setting value about the issue timing of the first synchronizing signal 208 and the setting value about the reset scan start period 600 are reflected as the valid setting values than the timing at which these setting value are calculated. Thereby, the CPU 110 certainly synchronizes the first and second synchronizing signal 208 and 209 and reduces the difference in the exposure amount in the image between lines of the image sensor 107.

Moreover, when the time difference between the times at which the first and second synchronizing signal 208 and 209 are asserted becomes equal to or more than the threshold Δ, the CPU 110 controls the time measurement unit 206 so as not to measure the above-mentioned times in the following frame (controller). This is because it is not necessary to change the various setting values as mentioned above.

Furthermore, when the deviation of the issue timing of the first synchronizing signal 208 is corrected, the reset scan start timing is also shifted by the same time difference as the time difference before and after correcting the deviation. This is capable of canceling the deviation while keeping an accumulation period constant.

The method described in this embodiment mitigates significantly the restriction of the timings at which the setting values are transmitted.

Next, a fourth embodiment of the present invention will be described. The first, second, and third embodiments disclose the examples that reduce the deviation of operation times between the modules, which operate with the clocks generated from the two independent clock generators, below the certain value. This embodiment discloses an example that reduces the deviation of operation times between modules, which operate with clocks generated from three or more clock generators, below a certain value.

FIG. 11 is a block diagram schematically showing an entire configuration of an image pickup apparatus as an information processing apparatus concerning a fourth embodiment. It should be noted that the same reference numeral is given to the same component in the block diagram in FIG. 1.

The block diagram in FIG. 11 has a pellicle mirror 1100 on the optical path in addition to the block diagram in FIG. 1. The pellicle mirror 1100 transmits a half of light and reflects the remaining half. The light reflected by the pellicle mirror 1100 is guided to the second image sensor 1101 (a third module). The second image sensor 1101 is arranged at the position of which an optical distance from an object is equal to that of the image sensor 107. Accordingly, the same image that is formed on the image sensor 107 is formed on the second image sensor 1101.

Figure 12:
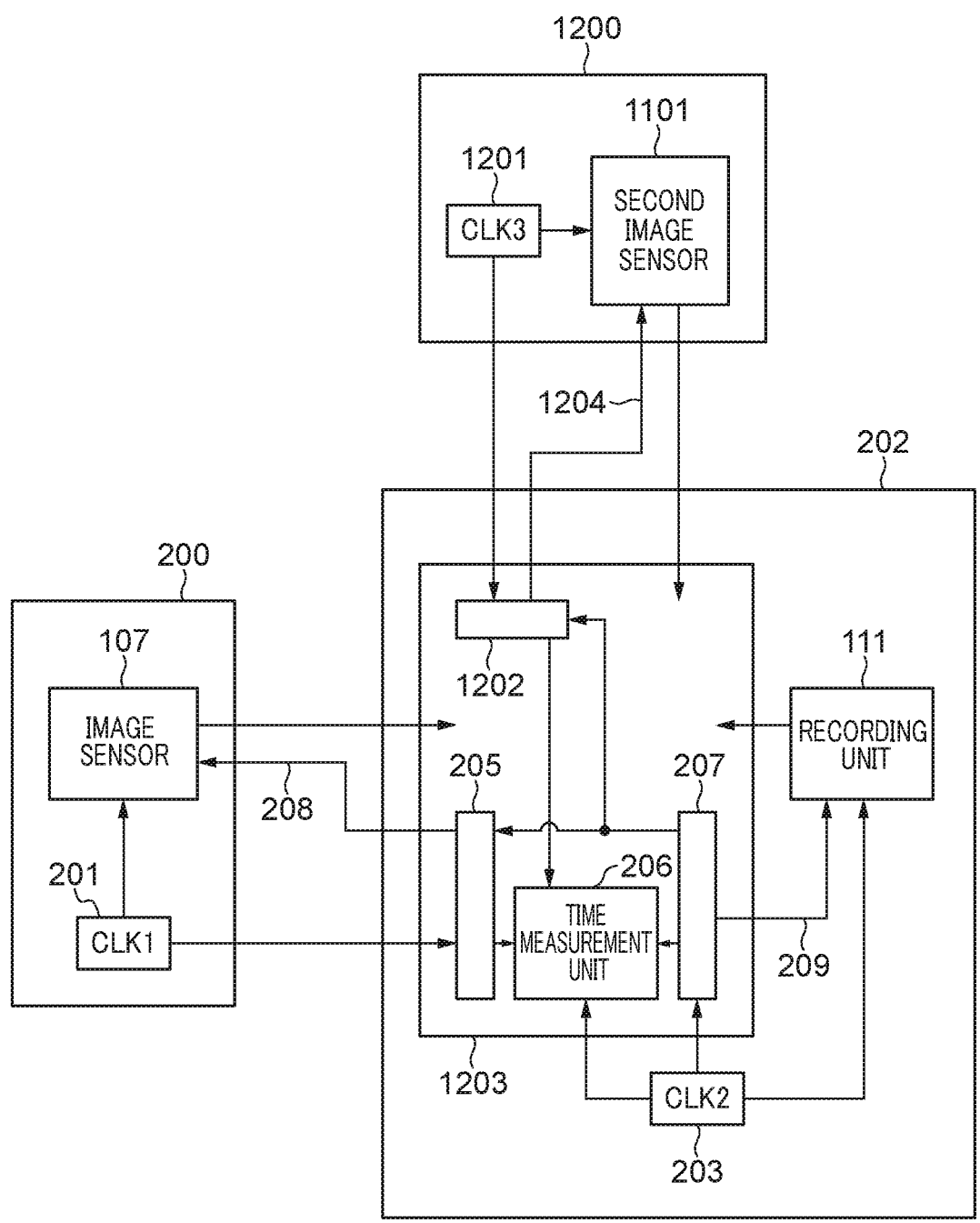
FIG. 12 is a substrate layout view of the image pickup apparatus in FIG. 11.

FIG. 12 is a substrate layout view of the image forming apparatus in FIG. 11. It should be noted that only elements that are needed to describe the embodiment will be described and descriptions about other elements will be omitted. Moreover, the same reference numeral is applied to the component already described in FIG. 2 and FIG. 11.

The second image sensor 1101 and a third clock generator (CLK3) 1201 that generates a third clock and consists of an oscillator, for example, are mounted on a third substrate 1200. Since the second image sensor 1101 and the third clock generator 1201 are mounted in the vicinity on the same substrate, a high-quality clock can be supplied to the second image sensor 1101.

A signal processing circuit 1203 mounted on the second substrate 202 is an IC including the DSP 108 and the CPU 110 in FIG. 11. The signal processing circuit 1203 includes the first synchronizing signal generation circuit 205 that operates at the first clock, the second synchronizing signal generation circuit 207 that operates by the second clock, and the time measurement unit 206 that operates by the second clock. In addition, a third synchronizing signal generation circuit 1202 (a third timing controller) that operates by a third clock is also included.

The time measurement unit 206 measures times at which the first and second synchronizing signals 208 and 209 are asserted and measures a time at which the third synchronizing signal is asserted.

The second image sensor 1101 captures an image corresponding to one frame of a moving image captured by the image sensor 107 in synchronization with a third synchronizing signal 1204, which is generated by the third synchronizing signal generation circuit 1202, and outputs the obtained image data to the signal processing circuit 1203. Since the third synchronizing signal generation circuit 1202 that supplies the third synchronizing signal 1204 to the second image sensor 1101 operates with a high-quality clock generated from the third clock generator 1201, the high-speed transmission of image data is available.

In the first, second, and third embodiments, when the time difference between the times at which the first and second synchronizing signals 208 and 209 are asserted is equal to or more than the threshold Δ, the CPU 110 reduces the above-mentioned time difference below a certain value by delaying the timing of asserting the first synchronizing signal 208. This operation does not change even if the third synchronizing signal generation circuit 1202 is added to the image pickup apparatus as this embodiment.

However, since the third synchronizing signal generation circuit 1202 is added to the image pickup apparatus, the CPU 110 calculates the time difference between the timings at which the third synchronizing signal 1204 and the second synchronizing signal 209 are asserted. When this calculated time difference is equal to or more than the threshold Δ, the CPU 110 changes the setting value about the issue timing of the third synchronizing signal 1204 that is set to the third synchronizing signal generation circuit 1202 by a predetermined value. The method of changing the setting value is the same as the method disclosed in the first, second, and third embodiments. The time difference between the times at which the third synchronizing signal 1204 and the second synchronizing signal 209 are asserted can be reduced below the certain value on the basis of the issue timing of the second synchronizing signal 209 by controlling the third synchronizing signal generation circuit 1202 in this way.

As mentioned in the first, second, and third embodiments, the timing at which the first synchronizing signal 208 is asserted is also controlled on the basis of the timing at which the second synchronizing signal 209 is asserted so that the time difference therebetween will be equal to or less than the certain value. Accordingly, in this embodiment, the time difference between the times at which the first, second, and third synchronizing signals 208, 209, and 1204 are asserted can be held below the certain value by controlling the first synchronizing signal generation circuit 205 and the third synchronizing signal generation circuit 1202.

The above point is generalizable. That is, when there are three or more independent synchronizing signal generation circuits in an information processing apparatus, timings at which synchronizing signals from the synchronizing signal generation circuits are asserted are controlled on the basis of the timing at which one of the synchronizing signals is asserted. This enables synchronization of the timings at which the synchronizing signals from the synchronizing signal generation circuits are asserted.

As mentioned above, in this embodiment, when an information processing apparatus includes three or more independent synchronizing signal generation circuits, a time difference between timings at which synchronizing signals generated from the synchronizing signal generation circuits are asserted is controlled to be reduced below a certain value.

Although the second image sensor 1101 is controlled by the third synchronizing signal generation circuit 1202 in this embodiment, a controlled target is not limited to this. For example, the present invention is applicable to any devices, such as an external sound recording device and a display device, that perform an operation corresponding to one frame of a moving image captured by the image sensor 107 in synchronization with a synchronizing signal that is generated by a synchronizing signal generation circuit on the same substrate.

Although the preferable embodiments of the present invention have been described above, the present invention is not limited to these embodiments, and various deformations and variations are available within the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-004342, filed Jan. 15, 2019, which is hereby incorporated by reference herein in its entirety.

What is claimed is:

1. An information processing apparatus comprising:
 a first clock generator that generates a first clock;
 a second clock generator that generates a second clock;
 a first module;
 a second module that is different from the first module;
 a first timing controller that operates at the first clock;
 a second timing controller that operates at the second clock;
 a time measurement unit that measures times at which a synchronizing signal is supplied to the first module and the second module;
 a memory device that stores a set of instructions: and
 at least one processor that executes the set of instructions to:
 control the first module to perform an operation in synchronization with a first synchronizing signal by supplying the first synchronizing signal from the first timing controller to the first module;
 control the second module to perform an operation in synchronization with a second synchronizing signal by supplying the second synchronizing signal from the second timing controller to the second module based on a first setting period;

control the time measurement unit to measure a first time at which the first synchronizing signal is supplied to the first module and a second time at which the second synchronizing signal is supplied to the second module;

calculate a time difference between the first time and the second time in a case where an operation mode of the first timing controller is switched to a second mode in which the first synchronizing signal is supplied to the first module based on a second setting period after synchronizing the first synchronizing signal with the second synchronizing signal in a first mode in which the first synchronizing signal is supplied to the first module in synchronization with the second synchronizing signal; and change the second setting period by a second period in a case where the time difference calculated is not less than a first period.

2. The information processing apparatus according to claim 1, wherein the time measurement unit operates at the second clock.

3. The information processing apparatus according to claim 1, wherein the first clock generator and the first module are mounted on a first substrate, and the second clock generator and the second module are mounted on a second substrate.

4. The information processing apparatus according to claim 1, wherein the first module comprises an image sensor.

5. The information processing apparatus according to claim 4, wherein the at least one processor executes instructions to control the image sensor to capture one frame of a moving image in synchronization with the first synchronizing signal.

6. The information processing apparatus according to claim 5, wherein the at least one processor executes instructions to control the second module to perform an operation corresponding to the one frame of the moving image in synchronization with the second synchronizing signal.

7. The information processing apparatus according to claim 6, wherein the second module comprises one of a sound recording unit that records sound corresponding to the one frame of the moving image, a display unit that performs live view display corresponding to the one frame of the moving image, and a second image sensor that is arranged at a position of which an optical distance from an object is equal to that of the image sensor.

8. The information processing apparatus according to claim 5, wherein the second period is equal to the first period.

9. The information processing apparatus according to claim 5, wherein the second period is equal to an integral multiple of a cycle of a horizontal synchronization signal of the image sensor.

10. The information processing apparatus according to claim 5, wherein the second period is equal to an integral multiple of a settable unit of a reset scan start timing of the image sensor.

11. The information processing apparatus according to claim 5, wherein the at least one processor executes instructions to control the first timing controller to shift a timing at which the first synchronizing signal of a (n+1)th frame is supplied in a case where the time difference between the times measured in the n-th frame is not less than the first period.

12. The information processing apparatus according to claim 11, wherein the at least one processor executes instructions to control the first timing controller to change a reset scan start timing of the (n+1)th frame by the second period in the case where the time difference between the times measured in the n-th frame is not less than the first period.

13. The information processing apparatus according to claim 11, wherein the at least one processor executes instructions to control the time measurement unit not to measure times at which the first and second synchronizing signals are supplied in the (n+1)th frame in the case where the time difference between the times measured in the n-th frame is not less than the first period.

14. The image processing apparatus according to claim 1, further comprising:

a third clock generator that generates a third clock;

a third module that is different from the first and second modules; and a third timing controller that operates at the third clock;

wherein the at least one processor executes instructions to:

control the third module to perform an operation in synchronization with a third synchronizing signal by supplying the third synchronizing signal from the third tuning controller to the third module, control the time measurement unit to measure a third time at which the third synchronizing signal is supplied to the third module, and change a timing at which the third timing controller supplies the third synchronizing signal to the third module by a fourth period in a case where a time difference between the second and third times measured is not less than a third period.

15. The information processing apparatus according to claim 14, wherein the third clock generator and the third module are mounted on a third substrate.

16. The information processing apparatus according to claim 14, wherein the first module comprises an image sensor that captures one frame of a moving image in synchronization with the first synchronizing signal, and wherein the at least one processor executes instructions to control the third module to perform an operation corresponding to the one frame of the moving image in synchronization with the third synchronizing signal.

17. The information processing apparatus according to claim 16, wherein the third module comprises one of a sound recording unit that records sound corresponding to the one frame of the moving image, a display unit that performs live view display corresponding to the one frame of the moving image, and a second image sensor that is arranged at a position of which an optical distance from an object is equal to that of the image sensor.

18. A control method for an information processing apparatus that comprises a first clock generator that generates a first clock, a second clock generator that generates a second clock, a first module, a second module that is different from the first module, a first timing controller that operates at the first clock, a second timing controller that operates at the second clock, a time measurement unit that measures times at which a synchronizing signal is supplied to the first module and the second module, the control method comprising:

controlling the first module to perform an operation in synchronization with a first synchronizing signal by supplying the first synchronizing signal from the first timing controller to the first module;

controlling the second module to perform an operation in synchronization with a second synchronizing signal by supplying the second synchronizing signal from the second timing controller to the second module based on a first setting period;

controlling the time measurement unit to measure a first time at which the first synchronizing signal is supplied to the first module and a second time at which the second synchronizing signal is supplied to the second module;

calculating a time difference between the first time and the second time in a case where an operation mode of the first timing controller is switched to a second mode in which the first synchronizing signal is supplied to the first module based on a second setting period after synchronizing the first synchronizing signal with the second synchronizing signal in a first mode in which the first synchronizing signal is supplied to the first module in synchronization with the second synchronizing signal; and changing the second setting period by a second period in a case where the time difference calculated is not less than a first period.

19. A non-transitory computer-readable storage medium storing a control program causing a computer to execute a control method for an information processing apparatus that comprises a first clock generator that generates a first clock, a second clock generator that generates a second clock, a second module that is different from the first module, a first timing controller that operates at the first clock; a second timing controller that operates at the second clock, and a time measurement unit that measures times at which a synchronizing signal is supplied to the first module and the second module, the control method comprising:

controlling the first module to perform an operation in synchronization with a first synchronizing signal by supplying the first synchronizing signal from the first timing controller to the first module;

controlling the second module to perform an operation in synchronization with a second synchronizing signal by supplying the second synchronizing signal from the second timing controller to the second module based on a first setting period;

controlling the time measurement unit to measure a first time at which the first synchronizing signal is supplied to the first module and a second time at which the second synchronizing signal is supplied to the second module;

calculating a time difference between the first time and the second time in a case where an operation mode of the first timing controller is changed to a second mode in which the first synchronizing signal is supplied to the first module based on a second setting period after synchronizing the first synchronizing signal with the second synchronizing signal in a first mode in which the first synchronizing signal is supplied to the first module in synchronization with the second synchronizing signal; and changing the second setting period by a second period in a case where the time difference calculated is not less than a first period.

\* \* \* \* \*